UNITED STATES PATENT OFFICE.

HERMAN von UFFEL, OF PHILADELPHIA, PENNSYLVANIA.

COMBINATION-GRIT FOR FOWLS.

1,178,279.  Specification of Letters Patent.  Patented Apr. 4, 1916.

No Drawing. Application filed September 22, 1915. Serial No. 52,108.

*To all whom it may concern:*

Be it known that I, HERMAN VON UFFEL, a citizen of the United States, and a resident of Philadelphia, in the county of Philadelphia and State of Pennsylvania, have invented a new and Improved Combination-Grit for Fowls, of which the following is a full, clear, and exact description.

My invention relates to a feed for fowls in the form of a combination grit in which the particles of grit proper are enriched with a certain fixed covering or coating of any suitable substance which is easily assimilated. The coating may consist of a substance containing either a food or a stimulant or both.

An object of the invention is to provide a feed in the form of a combination grit which will be attractive to fowls and have curative and sanitary properties.

It is a well known fact that fowls, particularly chickens, have a great avidity for brilliant particles, and this I am taking advantage of in my combination grit. I use for the grit proper, or the abrasive substance, a silex containing silica, traces of alumina and iron. This particular silex is a mineral of crystalline nature and high brilliancy containing silica 99.64%, alumina 33%, and iron .03%. The silex can be crushed to any desired mesh, the brilliancy of the crushed particles being increased by the crystalline structure of the mineral.

The particles of silex are enriched by the coating in such a way that the brilliancy of the particles is substantially unimpaired. Although any easily assimilated coating may be used, preferably the particles are coated with lime. Compounds containing calcium are absolutely essential to fowls for the formation of the egg shell. It is well known that lime serves as a curative and sweetens the "craw," gizzard, stomach and digestive organs of the fowl and will prevent ailments common to fowls, such as sour organs and intestinal troubles, in both young and full-grown fowls.

To retain the brilliancy of the particles, the same are sprinkled or washed with a saturated solution of the calcium compound. The thin coating formed thereupon by the wash or sprinkling leaves the brilliancy of the particles substantially unimpaired, and, therefore, their attractiveness to fowls is as great as in their original form. The granular form of the particles exposes a large coating surface for the film of food or stimulant.

The coating on the particles of silex is so thin that there is no danger that the fowls will absorb an excess of the compound, while whatever amount they absorb with the grit will be easily and quickly assimilated, for the friction of the particles with the grains of food to be digested by the fowl will help to assimilate the substance with which the particles are coated. The calcium compound in solution which I prefer to use is lime water. This method of administration of combined grit and lime provides the necessary means for grinding the food particles, such as grain, and also serves as a preventive of disease.

This method of the administration of grit coated with a calcium compound eliminates the commonly prescribed addition to the food of oyster shells, granulated charcoal and other similar stimulants or foods. The grit particles may be furnished to the fowls in variable sizes according to the age of the fowl, and thereby the amount of lime and iron present controlled.

It will be easily seen that no matter what the character of the food or stimulant may be, when the particles of silex are coated with such a thin film of the compound the brilliancy of the particles will remain substantially unimpaired and their attractiveness to the fowl will remain as great as if the particles had not been coated at all, but their value as carriers for a food or stimulant to the fowl would be greatly increased.

I claim:

1. A combination grit for fowls, consisting of a brilliant abrasive substance and a coating of food on the abrasive substance, said coating leaving the brilliancy of the abrasive substance substantially unimpaired.

2. A combination grit for fowls, consisting of an abrasive substance and a film of food on the abrasive substance, said film leaving the appearance of the abrasive substance substantially unimpaired.

3. A combination grit for fowls, consisting of a silex and a coating or food on the silex, said coating leaving the natural appearance of the silex substantially unimpaired.

4. A combination grit for fowls, consisting of an abrasive substance and a thin film of a compound containing calcium on said abrasive substance.

5. A combination grit for fowls, consisting of an abrasive substance and a thin film of lime on the abrasive substance, said film leaving the natural appearance of the abrasive substance substantially unimpaired.

6. A combination grit for fowls, consisting of a silex and a thin film of lime on the silex, said film leaving the natural appearance of the silex substantially unimpaired.

7. A combination grit for fowls, consisting of a silex having traces of iron and a thin film of lime covering the silex, so that the natural appearance of the silex is substantially unimpaired.

8. A fowl feed comprising particles of an abrasive substance and a coating on said particles of a substance easily assimilable.

9. A fowl feed comprising particles of a brilliant silex and a coating on said particles of silex of a substance easily assimilable, said coating leaving the brilliancy of the silex substance unimpaired.

In testimony whereof I have signed my name to this specification in the presence of two subscribing witnesses.

HERMAN von UFFEL.

Witnesses:
HENRY M. KAHN,
JOSEPH M. KAHN.